United States Patent
Yen et al.

[11] Patent Number: 6,159,634
[45] Date of Patent: Dec. 12, 2000

[54] BATTERY SEPARATOR

[75] Inventors: William W. Yen, Arlington; Douglas J. Woodnorth, Needham; James J. Cervera, Medway, all of Mass.

[73] Assignee: Duracell Inc., Bethel, Conn.

[21] Appl. No.: 09/060,602

[22] Filed: Apr. 15, 1998

[51] Int. Cl.[7] .................................................. H01D 2/16
[52] U.S. Cl. ........................ 429/144; 429/255; 428/532
[58] Field of Search ................................ 429/144, 145, 429/255; 428/532

[56] References Cited

U.S. PATENT DOCUMENTS

| | | | |
|---|---|---|---|
| 3,669,746 | 6/1972 | Devitt et al. | 136/30 |
| 3,892,591 | 7/1975 | Uetani et al. | 136/102 |
| 3,980,497 | 9/1976 | Gillman et al. | |
| 4,122,133 | 10/1978 | Bernstein et al. | 260/878 R |
| 4,172,183 | 10/1979 | Rüetschi | 429/144 X |
| 4,201,838 | 5/1980 | Goldberg | 429/145 |
| 4,217,404 | 8/1980 | Verzwyvelt | 429/206 |
| 4,287,276 | 9/1981 | Lundquist, Jr. et al. | 429/206 |
| 4,298,666 | 11/1981 | Taskier | 429/206 |
| 4,359,510 | 11/1982 | Taskier | 429/144 |
| 4,361,632 | 11/1982 | Weber et al. | 429/145 |
| 5,116,698 | 5/1992 | Sears | 429/144 X |
| 5,342,708 | 8/1994 | Green et al. | 429/145 |
| 5,366,832 | 11/1994 | Hayashi et al. | 429/249 |
| 5,376,477 | 12/1994 | Aidman et al. | 429/144 X |
| 5,426,004 | 6/1995 | Bayles et al. | 429/144 |
| 5,691,077 | 11/1997 | Yu | 429/144 X |

FOREIGN PATENT DOCUMENTS

| | | |
|---|---|---|
| 54-084240 | 7/1979 | Japan . |
| 56-079851 | 6/1981 | Japan . |
| 57-174858 | 10/1982 | Japan . |
| 59-169057 | 9/1984 | Japan . |
| 01014863 | 1/1989 | Japan . |
| 01027158 | 1/1989 | Japan . |
| 01239761 | 9/1989 | Japan . |
| 07272710 | 10/1995 | Japan . |

*Primary Examiner*—Stephen Kalafut
*Attorney, Agent, or Firm*—Fish & Richardson P.C.

[57] ABSTRACT

A thin separator for batteries is provided. The separator includes a layer that reduces dendrite shorting and a nonwoven layer. Typically, the separator also includes a laminate layer disposed between the nonwoven layer and the layer which reduces dendrite shorting. Additional nonwoven layers can also be included in the separator.

34 Claims, 2 Drawing Sheets

BATTERY SEPARATOR

BACKGROUND OF THE INVENTION

The invention relates to batteries.

Batteries, such as alkaline batteries, are commonly used as energy sources. Generally, alkaline batteries have a cathode, an anode, a separator and an electrolytic solution. The cathode is typically formed of manganese dioxide, carbon particles and a binder. The anode can be formed of a gel including zinc particles. The separator is usually disposed between the cathode and the anode. The electrolytic solution, which is dispersed throughout the battery, can be a hydroxide solution.

SUMMARY OF THE INVENTION

The invention relates to batteries, such as alkaline batteries, having thin separators. The thin separators can allow good ion flow between the anode and the cathode while reducing dendrite shorting between the anode and the cathode. Dendrite shorting refers to the situation where zincate migrates between electrodes of the battery, resulting in an electrical connection between the anode and the cathode. Zincate is a type of zinc oxide compound that can be formed in an alkaline battery under certain circumstances.

The thin separators can allow an increased amount of cathode material, anode material and/or electrolytic solution to be included in these batteries. This can result in improved performance at low, intermediate and high energy outputs and/or discharge rates. The batteries can have a variety of industry standard sizes, such as AA, AAA, AAAA, C or D.

In one aspect, the invention features a battery separator that includes a cellophane layer and a nonwoven layer. The cellophane layer is less than 0.83 mils thick.

In another aspect, the invention features a battery separator that includes a layer of material which reduces dendrite shorting and a nonwoven layer. The layer of material which reduces dendrite shorting is less than 0.83 mils thick.

In another aspect, the invention features a battery separator that includes a cellophane layer and a nonwoven layer. The battery separator is less than 8.3 mils thick.

In another aspect, the invention features a battery separator that includes a layer of material that reduces dendrite shorting and a nonwoven layer. The battery separator is less than 8.3 mils thick.

In another aspect, the invention features a battery separator that includes a cellophane layer and a nonwoven layer that has a basis weight of less than about 30 grams per square meter.

In another aspect, the invention features a battery separator that includes a layer of material which reduces dendrite shorting and a nonwoven layer that has a basis weight of less than about 30 grams per square meter.

In another aspect, the invention features a battery separator that includes a cellophane layer and a nonwoven layer. The battery separator has a basis weight of less than about 90 grams per square meter.

In another aspect, the invention features a battery separator that includes a layer of material which reduces dendrite shorting and a nonwoven layer. The battery separator has a basis weight of less than about 90 grams per square meter.

In another aspect, the invention features a battery separator that includes a cellophane layer and a nonwoven layer. The battery separator has an impedance of less than about 90 milliohms when measured according to the one kilohertz test described below.

In another aspect, the invention features a battery separator that includes a layer of material which reduces dendrite shorting and a nonwoven layer. The battery separator has an impedance of less than about 90 milliohms when measured according to the one kilohertz test described below.

The invention also features batteries including an anode, a cathode and one of the separators described above.

As used herein, the "one kilohertz test" refers to an impedance test for battery separators in which a portion of the separator is immersed in an aqueous 40% potassium hydroxide solution. While being held within the potassium hydroxide solution, the separator is then placed between a positive electrode and a negative electrode. An electrical current is then sent between the electrodes at a frequency of one kilohertz while the impedance of the separator is measured. The one kilohertz test is typically conducted without incorporating the separator into the battery.

The batteries can demonstrate good results when tested according to the one kilohertz test, the photo test, the 1 Watt continuous test, the 1 Watt pulsed test, the half Watt rm test and/or the 10 Ohm test. These tests as described herein.

Other features and advantages of the invention will be apparent from the description of the preferred embodiments thereof and the claims.

DESCRIPTION OF THE PREFERRED EMBODIMENTS

Figure 1:
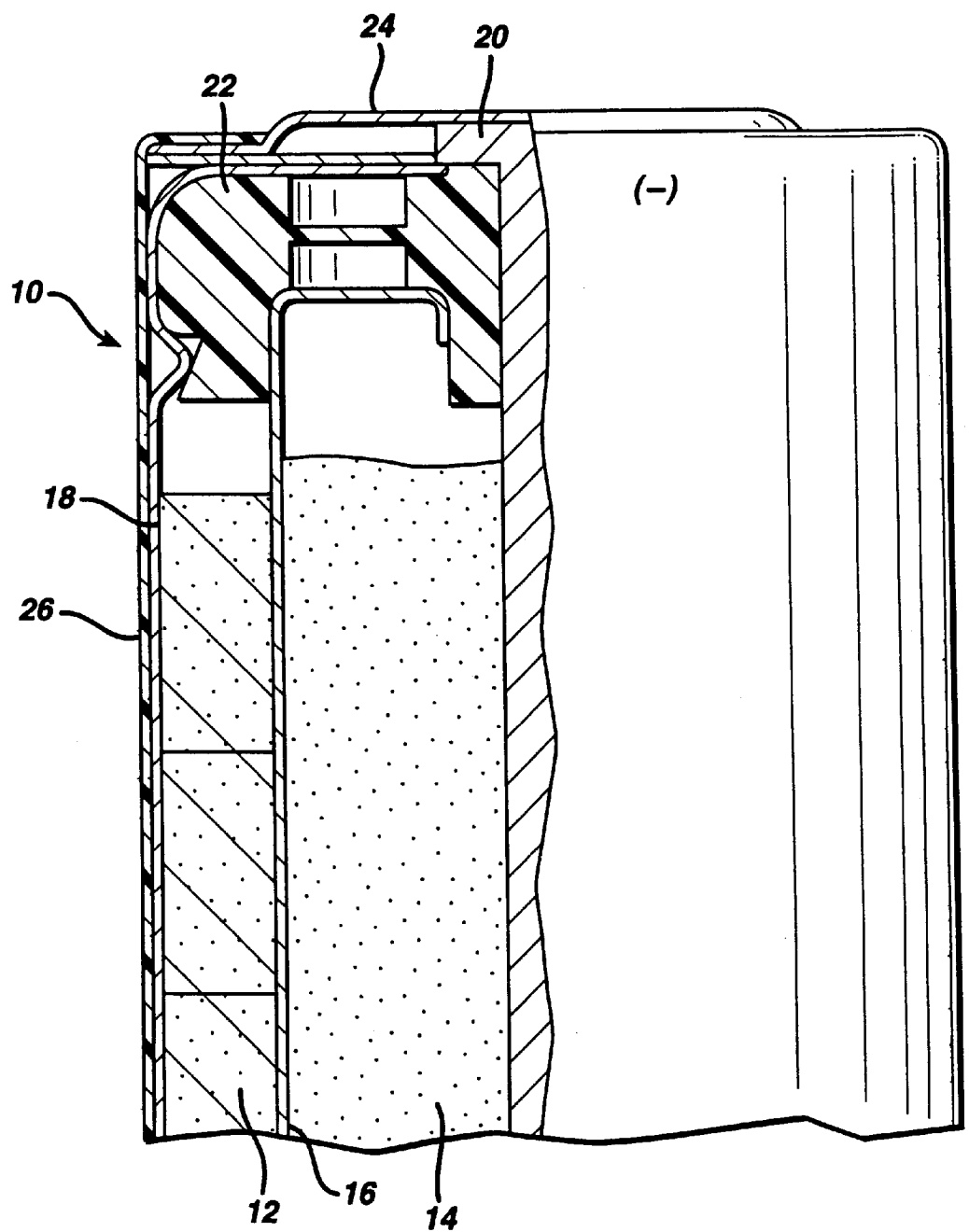
FIG. 1 is a cross-sectional view of a battery.
Figure 2:
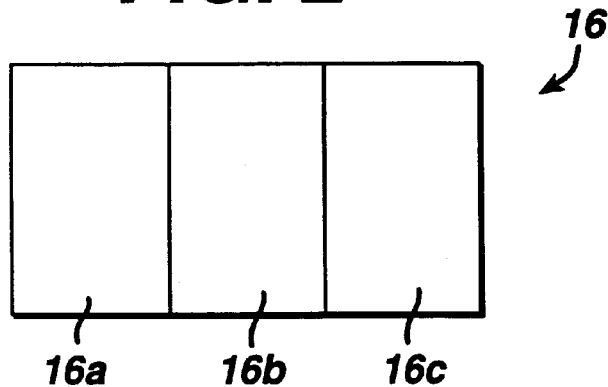
FIG. 2 is a cross-sectional view of a separator.

The preferred batteries are alkaline batteries that have a thin separator. FIG. 1 shows such a battery 10 that has a cathode 12, an anode 14, a separator 16, an outer wall 18 that contacts the outer diameter of cathode 12 and an insulating layer 26. Battery 10 further includes an anode collector 20 that passes through a seal member 22 and into anode 14. The upper end of anode collector 20 is connected to a negative end cap 24 which serves as the negative external terminal of battery 10. Layer 26 can be formed of an electrically nonconducting material, such as a heat shrinkable plastic. In addition, an electrolytic solution is dispersed throughout cathode 12, anode 14 and separator 16. As shown in FIG. 2, separator 16 includes a layer of material which reduces dendrite shorting 16a, a laminate material 16b, and a layer of nonwoven material 16c.

Separator 16 should be thick enough to reduce dendrite shorting between cathode 12 and anode 14 while allowing good ion flow between cathode 12 and anode 14. Separator 16 is preferably less than 8.3 mils thick, more preferably less than about 8 mils thick, and most preferably from about 1 mils to about 8 mils thick.

If the basis weight of separator 16 too high, there may not be sufficient ion flow between cathode 12 and anode 14. If the basis weight of separator 16 is too low, however, separator 16 may not be able to reduce dendrite shorting between cathode 12 and anode 14. Separator 16 preferably has have a basis weight of less than about 90 grams per square meter, more preferably less than about 75 grams per square meter, and most preferably from about 10 grams per square meter to about 75 grams per square meter.

The impedance of separator 16 should be high enough to prevent electrical shorting between cathode 12 and anode 14 while optimizing the efficiency of battery 10. Separator 16 preferably has an impedance of less than about 90 milliohms according to the one kilohertz test, more preferably less than about 75 milliohms according to the one kilohertz test, and most preferably from about 10 milliohms to about 60 milliohms according to the one kilohertz test.

Materials appropriate for use for layer 16a can include any material that is substantially inert to the electrolytic solution and capable of reducing dendrite shorting. Such materials include cellophane, polyvinyl alcohol (PVA), polysulfones, grafted polypropylene and polyamides. Layer 16a can include one or more plasticizers, but, typically, such plasticizers are not included in layer 16a. Generally, layer 16a is a porous layer that does not include wettable material coatings, metal coatings or fillers such as, for example, inorganic particles.

Layer 16a should be thick enough to assist in reducing dendrite shorting while being thin enough to allow good ion flow between cathode 12 and anode 14. Layer 16a is preferably less than 0.83 mils thick, more preferably less than about 0.8 mils thick, and most preferably from about 0.1 mils to about 0.8 mils thick.

In a preferred embodiment, layer 16a is formed of Cellophane P300 made by UCB films, located in Bridgwater, UK. This material has a thickness of about 0.82 mils.

Layer 16b can be formed of any material that is substantially inert to the electrolytic solution and that can form a physical and/or chemical bond to layer 16a and layer 16c such that separator 16 forms an integrated unit. Materials from which layer 16b is formed can include conventional laminate materials used for alkaline batteries, such as polyacrylic acids, grafted starch materials, carboxymethylcellulose and mixtures thereof. An example of a polyacrylic acid is Carbopol 940 (B. F. Goodrich), and an example of a grafted starch material is Waterlock A221 (Grain Processing Corporation, Muscatine, Iowa). Usually, layer 16b does not include wettable material coatings, metal coatings or fillers such as, for example, inorganic particles.

The amount of material used in layer 16b should be sufficient to ensure that separator 16 remains an integrated unit, but, if too much material is used in layer 16b, the impedance of separator 16 can become unacceptably high. Separator 16 preferably includes less than about 6 grams of laminate material per square meter of layer 16a, more preferably from about 1 gram to about 5 grams of laminate material per square meter of layer 16a, and most preferably about 3 grams of laminate material per square meter of layer 16a.

In a preferred embodiment, the laminate is made according to the method disclosed in U.S. Pat. No. 4,902,590, which is hereby incorporated by reference.

Layer 16c should be formed of a material that allows good ion flow between cathode 12 and anode 14. Typically, layer 16c is formed of one or more nonwoven materials, such as cellulose, PVA, polyamides, polysulfones and mixtures thereof. For example, layer 16c can be a nonwoven layer formed of a matrix of PVA fibers, PVA binder and cellulose fibers, such as Tencel fibers (Courtaulds), Lyocel fibers (Courtaulds) or rayon fibers. The cellulose fibers can be about 1.5 denier at 6 millimeters long, and the PVA fiber can be about 0.5 denier at 6 millimeters long.

In some embodiments, layer 16c can be a nonwoven layer formed of from about 20 weight percent to about 40 weight percent rayon fibers, from about 55 weight percent to about 65 weight percent PVA fibers and from about 5 weight percent to about 15 weight percent PVA binder. In one embodiment, layer 16c is a nonwoven layer formed of about 57 weight percent PVA fibers, about 30 weight percent cellulose fibers and 13 about weight percent PVA binder.

The basis weight of layer 16c should be low enough to provide good ion transport between cathode 12 and anode 14. Layer 16c preferably has a basis weight of less than about 30 grams per square meter, more preferably less than about 27.5 grams per square meter and most preferably less than about 25 grams per square meter.

Layer 16c should be thin enough to allow good ion transport between cathode 12 and anode 14 while reducing electrical shorting between cathode 12 and anode 14. When dry, layer 16c is preferably at least about 4 mils thick, more preferably from about 4 mils to about 6 mils thick, and most preferably about 5.4 mils thick. When wet, layer 16c is preferably at least about 8 mils thick, more preferably from about 8 mils to about 12 mils thick, and most preferably about 10 mils thick.

Separator 16 can be placed within battery 10 using any of the conventional processes, including cross-placing, tube-disc and tube-square techniques. In the cross-placing method, cathode 12 is formed within battery 10, and, prior to forming anode 14, separator 16 is pressed into battery 10 such that a portion of the surface of layer 16a or layer 16c is disposed along the inner circumference of cathode 12.

In the tube-disc process, cathode 12 is formed within battery 10, and, prior to forming anode 14, a circular disc is placed at the bottom of battery 10. Separator 16 is then formed into a tube and pressed into battery 10 such that a portion of the surface of layer 16a or 16c is disposed along the inner circumference of cathode 12.

In the tube-square method, cathode 12 is formed within battery 10, and, prior to forming anode 14, a square piece is placed at the bottom of battery 10. Separator 16 is shaped to match the square piece and pressed within battery 10 such that a portion of the surface of layer 16a or layer 16c is disposed along the inner circumference of cathode 12.

Because of separator 16 is relatively thin, the volume taken up by separator 16 is comparatively small, allowing battery 10 to include additional cathode material, anode material and/or electrolytic solution. This can increase the energy output and/or discharge rate of battery 10.

Figure 3:
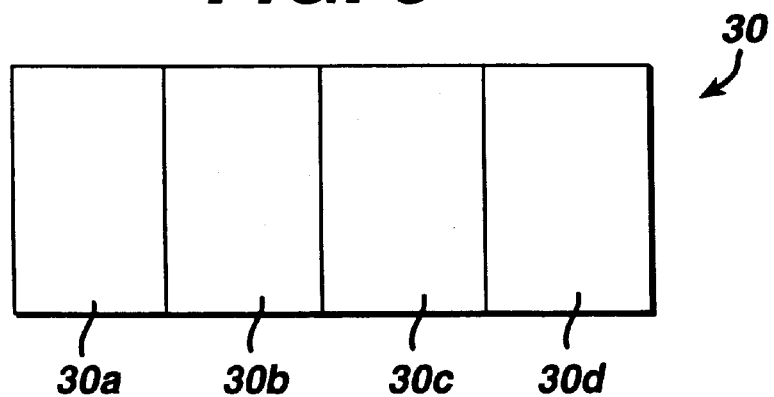
FIG. 3 is a cross-sectional view of a second separator.
Figure 4:
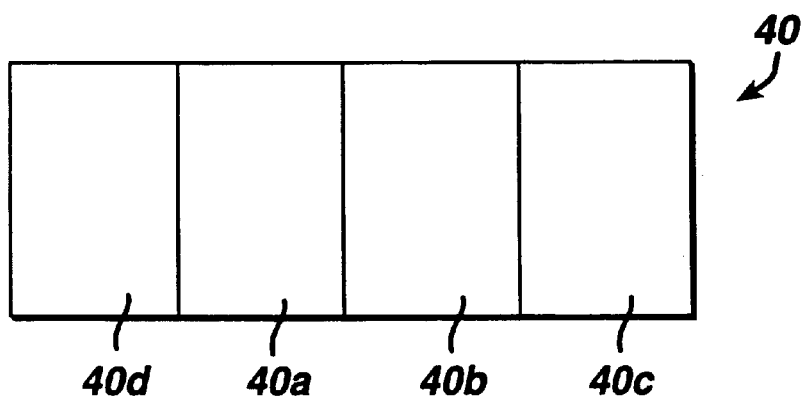
FIG. 4 is a cross-sectional view of a third separator.

The thin separators can include additional layers. For example, FIG. 3 shows a separator 30 that includes a layer of material which reduces dendrite shorting 30a, a laminate material 30b, a nonwoven layer 30c and a nonwoven layer 30d adjacent layer 30c. FIG. 4 shows a separator 40 that includes a layer of material which reduces dendrite shorting 40a, a laminate material 40b, a nonwoven layer 40c and a nonwoven layer 40d adjacent layer 40a.

In either of these four-layer embodiments, the separator should have an appropriate thickness and basis weight to provide good ion flow between cathode 12 and anode 14 while reducing dendrite shorting. The four-layer separator is preferably less than about 15 mils thick, more preferably less than about 13.5 mils thick, and most preferably from about 3 mils thick to about 12 mils thick. The four-layer separator preferably has a basis weight of less than about 150 grams per square meter, more preferably from about 30 grams to about 120 grams per square meter, and most preferably from about 50 grams per square meter to about 90 grams per square meter.

Tables I and II show the additional volume available as a result of using various designs of separators in a AA battery and a AAA battery, respectively. This extra volume can be used to increase the amount of electrolytic solution, cathode material and/or anode material. Layer 16a included cellophane and optionally glycerine as a plasticizer. When glycerine was used, layer 16a included less than about 20 weight percent glycerine. Layer 16b was polyacrylic acid at 3 grams per square meter. Layer 16c was formed of PVA binder, PVA fibers (1.5 denier) and rayon fibers (0.5 denier).

For the separators listed in Table I, the total amount of PVA was about 20 weight percent PVA binder and about 80 weight percent PVA fiber.

For the separators listed in Table II, layer 16c included about 22 weight percent rayon fiber, about 13 weight percent PVA binder and about 65 weight percent PVA fiber.

TABLE I

| Separator Placement Method | Thickness of Dendrite Shorting Reducing Layer | Basis Weight of First Nonwoven Layer (grams/m$^2$) | Basis Weight of Second Nonwoven Layer (grams/m$^2$) | Additional Volume (cc) |
| --- | --- | --- | --- | --- |
| cross-placed | 1[1] | 36[3] | 36[3] | 0 |
| cross-placed | 0.8[1] | 36[3] | 36[3] | 0.008 |
| cross-placed | 0.8[1] | 36[4] | 30[4] | 0.014 |
| cross-placed | 0.8[1] | 25[6] | 25[5] | 0.036 |
| cross-placed | 0.8[1] | 20[6] | 20[6] | 0.044 |
| cross-placed | 0.8[2] | 25[7] | 25[7] | 0.033 |
| cross-placed | 0.8[2] | 20[8] | 20[8] | 0.044 |
| tube-disc | 0.8[1] | 36[9] | None | 0.027 |
| tube-disc | 0.8[1] | 20[3] | None | 0.045 |
| tube-disc | 0.8[2] | 25[4] | None | 0.035 |
| tube-disc | 0.8[2] | 20[5] | None | 0.044 |
| tube-square | 0.8[1] | 20[6] | None | 0.044 |
| tube-square | 0.8[2] | 20[7] | None | 0.047 |
| cross-placed | 0.5[1] | 30[10] | 20[10] | 0.042 |
| tube-disc | 0.5[1] | 20[8] | None | 0.062 |
| tube-disc | 0.5[2] | 25[9] | None | 0.053 |
| tube-disc | 0.5[2] | 20[11] | None | 0.057 |
| tube-square | 0.5[1] | 20[12] | None | 0.056 |

[1]No plasticizer.
[2]Plasticizer.
[3]70% PVA and 30% rayon.
[4]80% PVA and 20% rayon.
[5]20% PVA and 80% rayon.
[6]90% PVA and 10% rayon.
[7]10% PVA and 90% rayon.
[8]0% PVA and 100% rayon.
[9]50% PVA and 50% rayon.
[10]100% PVA and 0% rayon.
[11]40% PVA and 60% rayon.
[12]60% PVA and 40% rayon.

TABLE II

| Separator Placement Method | Thickness of Dendrite Shorting Reducing Layer | Basis Weight of First Nonwoven Layer (grams/m$^2$) | Basis Weight of Second Nonwoven Layer (grams/m$^2$) | Additional Volume (cc) |
| --- | --- | --- | --- | --- |
| cross-placed | 1 | 36 | 36 | 0 |
| cross-placed | 0.8 | 36 | 36 | 0.005 |
| cross-placed | 0.8 | 20 | 36 | 0.018 |
| cross-placed | 0.8 | 36 | 20 | 0.018 |
| cross-placed | 0.8 | 20 | 20 | 0.030 |
| tube-disc | 0.8 | 36 | None | 0 |
| tube-disc | 0.8 | 20 | None | 0.033 |
| tube-disc | 0.5 | 20 | None | 0.040 |
| cross-placed | 0.5 | 20 | 20 | 0.037 |

Cathode 12 can be formed of any of the standard materials used in battery cathodes. For example, cathode 12 can include manganese dioxide, nickel hydroxide, copper oxide, silver oxide or mercury oxide. Typically, cathode 12 is formed of a mixture of manganese dioxide, carbon particles and optionally a binder.

Any of the conventional forms of manganese dioxide used in battery cathodes may be used in cathode 12. Suppliers of such manganese dioxide include Kerr McGee, Co., Broken Hill Proprietary, Chem Metals, Co., Tosoh, Delta Manganese, Mitsui Chemicals and JMC.

The average particle size of the carbon particles is limited only by the dimensions of cathode 12. In addition, the carbon particles can be nonsynthetic or synthetic and expanded or nonexpanded. Nonsynthetic graphite particles are prepared by a process that does not include industrial or laboratory graphitization. Nonexpanded graphite particles have undergone no industrial or laboratory expansion process.

In embodiments in which cathode 12 may includes a binder, the binder can be selected from polyethylene powders, polyacrylamides, Portland cement and fluorocarbon resins, such as PVDF and PTFE.

In some embodiments, a layer of a conductive material can be disposed between wall 18 and the outer circumference of cathode 12. This layer can be disposed along the inner surface of wall 18 or along the outer circumference of cathode 12. Typically, this conductive layer is formed of a carbonaceous material. Such materials include LB1000 (Timcal), Eccocoat 257 (W. R. Grace & Co.) and Electrodag 109 (Acheson Industries, Inc.). Methods of applying the electrolytic material are disclosed in Canadian Patent No. 1,263,697, which is hereby incorporated by reference.

Anode 14 can be formed of any of the standard materials used in battery anodes. For example, anode 14 can include zinc, cadmium, aluminum, a metal hydride, magnesium or a hydrogen storage alloy. Often, anode 14 is formed of a zinc gel that includes zinc metal particles, a gelling agent and minor amounts of additives, such as gassing inhibitors. In addition, a portion of the electrolytic solution is dispersed within anode 14.

Gelling agents that can be used in anode 14 include polyacrylic acids, grafted starch materials, carboxymethylcellulose and mixtures thereof.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No.

4,777,100, which is hereby incorporated by reference. Preferred surfactants are dinonylphenol phosphate esters, such as RM 510, available from Rhone Poulenc. In some embodiments, anode 14 contains about 50 parts gassing inhibitor per one million parts zinc.

The electrolytic solution dispersed throughout battery 10 can be any of the conventional electrolytic solutions used in batteries. Typically, the electrolytic solution is an aqueous hydroxide solution. Such aqueous hydroxide solutions include, for example, potassium hydroxide solutions and sodium hydroxide solutions.

The batteries can demonstrate good results when tested according to the one kilohertz test, the photo test, the 1 Watt continuous test, the 1 Watt pulsed test, the half Watt rm test and/or the 10 Ohm test. These tests as described herein.

EXAMPLE I

AA batteries were prepared with the following components. The cathode included about 9.32 grams of manganese dioxide (Kerr-McGee, Co.), about 0.81 grams of nonsynthetic, nonexpanded graphite having an average particle size of about 7 microns (Brazilian Nacional de Grafite) and about 0.3 weight percent of coathylene HA-1861. The anode included about 4.21 grams of zinc particles, about 0.6 weight percent total gelling agent (Carbopol 940 and A221) and about 50 parts surfactant (RM 510, Rhone Poulenc) per one million parts zinc. The separator included three layers. The first layer was formed of cellophane (P300, UCB films) and had a thickness of about 0.83 mils. The second layer was formed of polyacrylic acid (Carbopol 940, B. F. Goodrich). The third layer was formed of a nonwoven material including about 57 weight percent PVA fibers, about 30 weight percent cellulose fibers and about 13 weight percent PVA binder. The separator had a total thickness of about 4.5 mils when dry and about 5 mils when wet. The basis weight of the cellophane layer was about 30 grams per square meter. The polyacrylic acid layer was present in an amount of about 3 grams per square meter of cellophane. The basis weight of the nonwoven layer was about 20 grams per square meter. The layers did not include any wettable material coatings, metal coatings or fillers. The battery also included about 3.82 grams of an aqueous potassium hydroxide (about 32.9 weight percent potassium hydroxide) solution. A thin coating of Electrodag 109 was disposed between the outer wall of the battery and the outer periphery of the cathode.

The AA batteries were stored at a temperature of from about 20.1° C. to about 22.1° C. for five days. The AA batteries were then stored according to the following procedure.

Each battery was visually examined for leakage or material damage and identified such that battery identification was be maintained throughout the test program. The batteries were oriented on their sides in holding trays such that the batteries were not in physical contact with each other. The holding trays were made to be resistant to heat and electrolytes. The trays were stored for 1 day at ambient conditions, after which the trays were placed in a preheated chamber. The trays were spaced so that there was at least about 5 cm (2 inches) of space between the chamber wall, and the tray above, below, or adjacent to each tray. The following 24 hour test sequence, shown in Table III was repeated for 14 days.

TABLE III

| Cycle Number | Time (Hrs.) | Temperature (± 2° C.) |
| --- | --- | --- |
| 1 | 6.0 | Ramp from 28 to 25 |
| 2 | 4.5 | Ramp from 25 to 34 |
| 3 | 2.0 | Ramp from 34 to 43 |
| 4 | 1.0 | Ramp from 43 to 48 |
| 5 | 1.0 | Ramp from 48 to 55 |
| 6 | 1.0 | Ramp from 55 to 48 |
| 7 | 1.0 | Ramp from 48 to 43 |
| 8 | 3.0 | Ramp from 43 to 32 |
| 9 | 4.5 | Ramp from 32 to 28 |
| | 24.0 (1 Day) | |

The trays were removed from the chamber and each battery was visually examined for leakage and material damage.

The following tests were subsequently performed on individual AA batteries. Each test was conducted at a temperature of from about 20.1° C. to about 22.1° C.

A AA battery was discharged from an open circuit voltage of about 1.6 Volts under constant current conditions of ten seconds per minute for one hour per day ("the photo test"). The AA battery reached 1 Volt after 187 pulses, and the AA battery reached 0.8 Volts after 495 pulses.

A AA battery was continuously discharged from an open circuit voltage of about 1.6 Volts at 1 Watt ("the 1 Watt continuous test"). The AA battery reached 1 Volt after about 0.85 hours, and the AA battery reached 0.8 Volts after about 1.18 hours.

A AA battery was continuously discharged from an open circuit voltage of about 1.6 Volts at a resistance of 10 Ohms at one hour per day ("the 10 Ohm test"). The AA battery reached 0.8 Volts after about 17.7 hours.

EXAMPLE II

A AAA battery was prepared. The cathode 12 included about 4.18 grams of manganese dioxide (Kerr McGee, Co.), about 0.36 grams of nonsynthetic, nonexpanded graphite having an average particle size of about 15 microns (Brazilian Nacional de Grafite) and about 0.3 weight percent of coathylene HA-1861. The anode 14 included about 1.68 grams of zinc particles, about 0.6 weight percent total gelling agent (Carbopol 940 and A221) and about 50 parts surfactant (RM 510, Rhone Poulenc) per one million parts zinc. The separator included four layers. The first layer was formed of a nonwoven material including about 57 weight percent PVA fibers, about 30 weight percent cellulose fibers and about 13 weight percent PVA binder. The second layer was formed of cellophane (P300, UCB films) and had a thickness of about 0.83 mils. The third layer was formed of polyacrylic acid (Carbopol 940, B. F. Goodrich). The fourth layer was formed of the same material as the first layer. The separator had a total thickness was about 8.0 mils when dry. The basis weight of the cellophane layer was about 30 grams per square meter. Each of the nonwoven layers had a basis weight of about 30 grams per square meter, and the polyacrylic acid layer was present in amount of about 3 grams per square meter of cellophane. The layers did not include any wettable material coatings, metal coatings or fillers. The battery also included about 1.76 grams of an aqueous potassium hydroxide (about 32.9 weight percent) solution. A thin coating of Electrodag 109 was disposed between the outer wall of the battery and the outer periphery of the cathode.

The AAA batteries were stored as described in Example I. Each AAA battery was discharged from an open circuit voltage of about 1.6 Volts, and the tests were conducted within the temperature range described in Example I.

A AAA battery was pulse discharged from an open circuit voltage of about 1.6 Volts at 0.5 Watts for fifteen minutes per hour ("the half Watt rm test"). The AAA battery reached 1 Volt after about 0.86 hours, and the AA battery reached 0.9 Volts after about 1.145 hours.

A AAA battery was tested according to the 1 Watt continuous discharge test. The battery was discharged from an open circuit voltage of about 1.6 Volts. The battery took about 0.179 hours to reach 1 Volt and about 0.353 hours to reach 0.8 Volts.

A AAA battery was continuously discharged from an open circuit voltage of about 1.6 Volts at a rate that alternated between 1 Watt (3 second pulses) and 0.1 Watts (0.7 second pulses) ("the pulsed 1 Watt test"). The battery took about 0.527 hours to reach 1 Volt and about 0.81 hours to reach 0.8 Volts.

A AAA battery was discharged according to the photo test. The AAA battery reached 0.9 Volts after 664 pulses.

Other embodiments are within the claims.

What is claimed is:

1. A battery separator, comprising:

a cellophane layer having a thickness of less than 0.83 mils;

a first nonwoven layer comprising fibers; and a laminate material disposed between the cellophane layer and the first nonwoven layer.

2. The battery separator according to claim 1, wherein the battery separator is less than 8.3 mils thick.

3. The battery separator according to claim 1, wherein the first nonwoven layer has a basis weight of less than about 30 grams per square meter.

4. The battery separator according to claim 1, wherein the battery separator has a basis weight of less than about 90 grams per square meter.

5. The battery separator according to claim 1, wherein the battery separator has an impedance of less than about 90 milliohms per square centimeter according to a one kilohertz test.

6. The battery separator according to claim 1, further comprising a second nonwoven layer comprising fibers, wherein the cellophane layer is disposed between the first and second nonwoven layers.

7. The battery separator according to claim 1, wherein the cellophane layer has a thickness of less than about 0.8 mils.

8. A battery separator, comprising:

a cellophane layer; and a first nonwoven layer comprising fibers, wherein the battery separator is less than 8.3 mils thick.

9. The battery separator according to claim 8, further comprising a laminate material disposed between the cellophane layer and the first nonwoven layer.

10. The battery separator according to claim 8, wherein the first nonwoven layer has a basis weight of less than about 30 grams per square meter.

11. The battery separator according to claim 8, wherein the battery separator has a basis weight of less than about 90 grams per square meter.

12. The battery separator according to claim 8, wherein the battery separator has an impedance of less than about 90 milliohms per square centimeter according to a one kilohertz test.

13. The battery separator according to claim 8, further comprising a second nonwoven layer, wherein the cellophane layer is disposed between the first and second nonwoven layers.

14. The battery separator according to claim 8, wherein the battery separator is less than about 8 mils thick.

15. A battery separator, comprising:

a layer of material which reduces dendrite shorting; and a nonwoven layer comprising fibers, wherein the battery separator is less than 8.3 mils thick.

16. A battery separator, comprising:

a cellophane layer;

a first nonwoven layer having a basis weight of less than about 30 grams per square meter, said nonwoven layer comprising fibers; and a laminate material disposed between the cellophane layer and the first nonwoven layer.

17. The battery separator according to claim 16, wherein the battery separator has a basis weight of less than about 90 grams per square meter.

18. The battery separator according to claim 16, wherein the battery separator has an impedance of less than about 90 milliohms per square centimeter according to a one kilohertz test.

19. The battery separator according to claim 16, further comprising a second nonwoven layer comprising fibers, wherein the cellophane layer is disposed between the first and second nonwoven layers.

20. A battery separator, comprising:

a cellophane layer;

a nonwoven layer comprising fibers; and a laminate material disposed between the cellophane layer and the first nonwoven layer;

wherein the battery separator has a basis weight of less than about 90 grams per square meter.

21. The battery separator according to claim 20, wherein the battery separator has an impedance of less than about 90 milliohms per square centimeter according to a one kilohertz test.

22. The battery separator according to claim 20, further comprising a second nonwoven layer comprising fibers, wherein the cellophane layer is disposed between the first and second nonwoven layers.

23. A battery separator, comprising:

a cellophane layer; and a nonwoven layer comprising fibers, wherein the battery separator has an impedance of less than about 90 milliohms per square centimeter according to a one kilohertz test.

24. The battery separator according to claim 23, further comprising a laminate material disposed between the cellophane layer and the first nonwoven layer.

25. The battery separator according to claim 23, further comprising a second nonwoven layer, wherein the cellophane layer is disposed between the first and second nonwoven layers.

26. A battery separator, comprising:

a layer of material which reduces dendrite shorting; and a nonwoven layer comprising fibers, wherein the battery separator has an impedance of less than about 90 milliohms per square centimeter according to a one kilohertz test.

27. A battery, comprising:

an anode;

a cathode; and a separator disposed between the anode and the cathode, wherein the separator comprises:

a cellophane layer; and a nonwoven layer comprising fibers, wherein the separator has an impedance of less than about 90 milliohms per square centimeter according to a one kilohertz test.

28. A battery separator, comprising:

a cellophane layer having a thickness of less than 0.83 mils; and a first nonwoven layer comprising fibers;

wherein the battery separator is less than 8.3 mils thick.

29. A battery separator, comprising:

a cellophane layer having a thickness of less than 0.83 mils; and a first nonwoven layer comprising fibers;

wherein the battery separator has an impedance of less than about 90 milliohms per square centimeter according to a one kilohertz test.

30. A battery separator, comprising:

a cellophane layer having a thickness of less than 0.83 mils;

a first nonwoven layer comprising fibers; and a second nonwoven layer comprising fibers;

wherein the cellophane layer is disposed between the first and second woven layers.

31. A battery separator, comprising:

a cellophane layer; and a first nonwoven layer having a basis weight of less than about 30 grams per square meter, said nonwoven layer comprising fibers;

wherein the battery separator has an impedance of less than about 90 milliohms per square centimeter according to a one kilohertz test.

32. A battery separator, comprising:

a cellophane layer;

a first nonwoven layer having a basis weight of less than about 30 grams per square meter, said nonwoven layer comprising fibers; and a second nonwoven layer comprising fibers;

wherein the cellophane layer is disposed between the first and second nonwoven layers.

33. A battery separator, comprising:

a cellophane layer; and a nonwoven layer comprising fibers;

wherein the battery separator has a basis weight of less than about 90 grams per square meter, and wherein the battery separator has an impedance of less than about 90 milliohms per square centimeter according to a one kilohertz test.

34. A battery separator, comprising:

a cellophane layer;

a nonwoven layer comprising fibers; and a second nonwoven layer comprising fibers;

wherein the cellophane layer is disposed between the first and second nonwoven layers, and wherein the battery separator has a basis weight of less than about 90 grams per square meter.

* * * * *